UNITED STATES PATENT OFFICE.

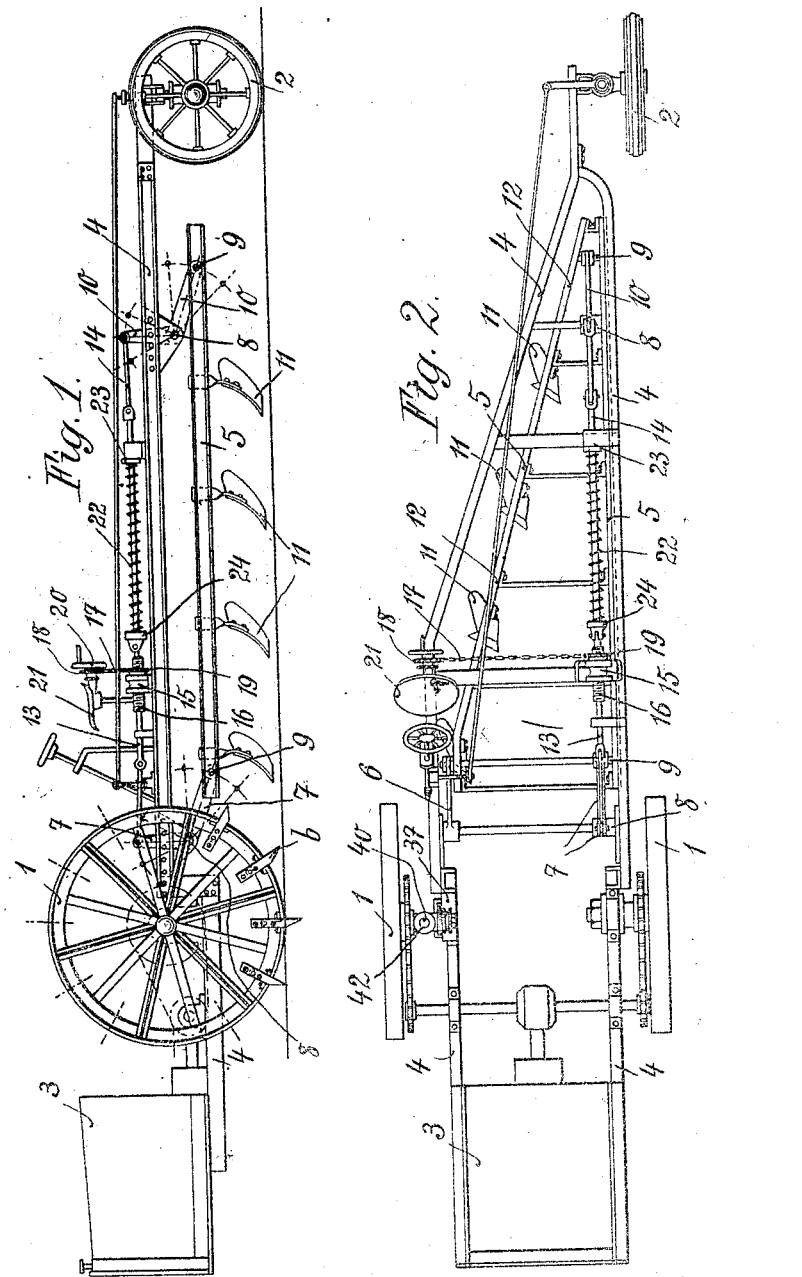

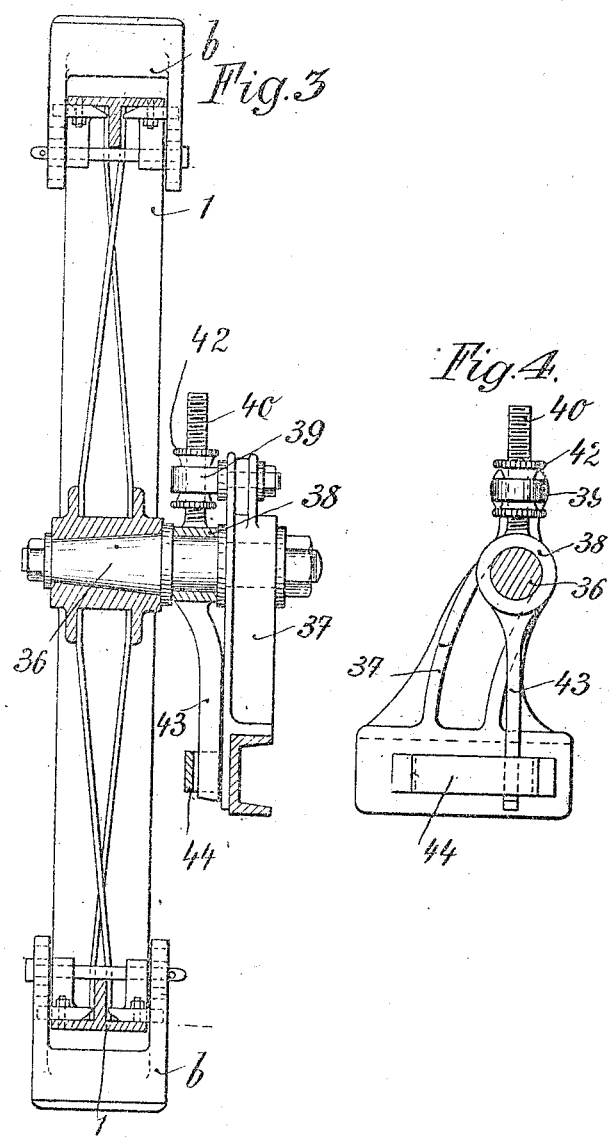

ERNST WENDELER, OF BERLIN, AND BOGUSLAV DOHRN, OF DOMINIUM WILHELMSHOF, NEAR PRENZLAU, GERMANY.

MOTOR-PLOW 1,182,334. Specification of Letters Patent. Patented May 9, 1916.

Application filed March 13, 1912. Serial No. 683,409.

*To all whom it may concern:*

Be it known that we, ERNST WENDELER, of Berlin, Germany, and BOGUSLAV DOHRN, of Dominium Wilhelmshof, near Prenzlau, Germany, subjects of the German Emperor, have invented certain new and useful Improvements in Motor-Plows, of which the following is a specification.

Our invention relates to motor plows in which the plow frame carrying the plowshares or other soil tilling tools is suspended pivotally on the carriage frame of the motor vehicle.

The invention has for its object to solve the problem of enabling the working depth of the tilling tool of the plow body to be rendered readily adjustable by the driver without losing its parallel position relatively to the ground.

The invention also consists in the arrangement that simultaneously with the vertical upward movement of the plowshare there is effected a horizontal movement to the rear whereby the plowshares are enabled to free themselves more easily from resistances in the ground when the plow body is lifted.

Further objects of the invention will become evident from the following specification and claims.

A preferred embodiment of our invention is illustrated in the accompanying drawings in which—

Figure 1 is a side elevation and Fig. 2 is a plan of a motor plow comprising the improvements of this invention. Fig. 3 is an enlarged vertical cross section of one of the driving wheels and Fig. 4 is a side elevation of an improved bearing for the driving wheel illustrated in Fig. 4, the driving wheel axle being shown in cross section.

The motor vehicle has three wheels, of which the large front wheels 1, 1 are driving wheels, and the small hind wheel 2 is the steering wheel. The greater part of the load is taken by the driving wheels, the steering wheels having to carry only a small part of the load. For this purpose the motor 3 is arranged in the front part of the carriage frame 4, and the plow frame 5 is arranged in the rear part thereof between the driving wheels and the steering wheels.

The plow frame or tool frame 5 which has the shape of a right-angled triangle, is mounted pivotally on the carriage frame 4 in such a manner that the steering movements of the carriage frame are transmitted positively to the tool frame 5. For this purpose three bell-crank levers 6, 7 and 10 are mounted on the frame 4, and their rocking on their stationary axes 8 produces accordingly a raising or a lowering movement of the plow frame 5 which is jointed at 9, 9 to the lower arms of these levers. Since these levers 6, 7 and 10 are parallel to one another and have arms of the same length, the plow frame will be always parallel to the carriage frame, and since the carriage frame is mounted parallelly to the surface of the ground the plow frame will therefore be always parallel to the surface of the ground. The plowshares 11 are mounted on the inclined beams 12 of the frame 5.

The suspension of the frame 5 by means of a few pivots allows of effecting readily a change by enabling frames carrying other tilling tools to be rapidly mounted in the place of the plowshare frame. The frame may obviously have a shape other than that of a triangle. Now in order to enable the raising and lowering of the plow frame to be effected easily and with certainty the free arms of the bell crank levers 6, 7 and 10 are connected together by rodding 13, 14 in such a manner that the plow frame, the levers and the rodding together form a parallelogram, wherein a horizontal movement of the rodding 13, 14 causes the plow frame 5 to rise and fall. This movement is produced by rotating a stationary nut 15 mounted on a long screw 16 forming part of the rodding 13, 14. This nut is rotated by means of a chain 17 and chain wheels 18, 19 from the handwheel 20 at the driver's seat 21. A right handed rotation of the nut produces a rise, and a left handed rotation a lowering of the plow frame, or vice versa. The nut 15 may however, be driven by any other means, for instance toothed wheels.

In order to reduce the power required at the hand wheel 20 for raising the plow frame, a spring 22 is inserted in the rodding 13, 14. This spring bears at 23 against a stop on the frame 4, and acts upon its abutment 24 in opposition to the weight of the plow frame. The force of this spring is preferably such as to wholly or partly counterbalance the plow frame. In this arrangement the nut 15 is assumed to be self-locking so that there is no necessity to provide a special locking device for holding the plow frame in determined positions.

The peculiar manner of mounting the driving wheels, 1, 1 of the motor plow according to this invention is clearly shown in Figs. 3 and 4.

It is well known that in motor plows and similar agricultural machines it is necessary that the driving wheel which runs in the furrow, must be so mounted as to be capable of vertical adjustment. The deeper the furrow the lower the wheel must be capable of being set with relation to the carriage frame in order that this frame shall remain parallel to the surface of the ground. The movement of the wheel or of the wheel axle for this vertical adjustment must in most cases describe an arc so as to enable the driving toothed wheel or chain of the driven wheel to remain in gear in all positions. This requirement prevents the use of the known arrangements of racks or long screws without considerable modification. For this reason the axle has been simply mounted in a detachable manner in its guide and the adjustment has been made by means of externally applied windlass, jacks etc. The invention thus solves the problem of effecting the vertical adjustment of the driving wheel without the help of lifting devices etc. by arranging a pendulating suspension of the journal bearing with a curved guide. With this object the axle 36 is mounted slidably but not rotatably in a guide 37 curved to an arc struck from the center of the driving toothed wheel, wherein the axle can be shifted higher or lower as required. The axle and therefore also the wheel is fixed in any desired position of vertical adjustment by means of a bearing 38 suspended from a rotatable sleeve 39 by a screw 40 made in one piece with or fixed to the bearing, and extending through the sleeve 39 wherein it can be adjusted and held in its adjusted position by means of nuts or screwed hand-wheels 42 or the like.

By turning the nuts or handwheels 42 the axle 36 can be shifted higher or lower in the curved guide 37, the pendulating suspension of the bearing 38 allowing for the turning movements due to the curved path. In order to prevent the bearing from tipping it is extended downward in the form of a sliding piece 43 adapted to slide in a guide 44 which allows sufficient play for the "throw" of the sliding piece due to the curved path of the axle in its guide 37.

It is to be understood that the pendulating arrangements may be modified, for instance the rotatable sleeve may be arranged underneath, and the guide 37 may be arranged above. In such a case the screw 40 would be in compression instead of in tension.

What we claim is:

1. In a motor plow having a carriage frame and a movable tilling tool frame suspended on bell crank levers of equal lengths pivoted to said carriage frame, means for raising and lowering said tool frame, said means comprising a rodding connecting the free ends of said bell crank levers and being combined with a spring actuating on said means in a direction opposite to the action of the weight of said tool frame and means for shifting said rodding, said shifting means comprising a screw gear capable of being operated from the driver's seat of the motor plow.

2. In a motor plow having a carriage frame and a movable tilling tool frame suspended on bell crank levers of equal lengths pivoted to said carriage frame, means for raising and lowering said tool frame, said means comprising a rodding connecting the free ends of said bell crank levers and being combined with a spring actuating on said means in a direction opposite to the action of the weight of said tool frame and means for shifting said rodding, said shifting means comprising a screw thread formed on said rodding and a nut engaging said thread, said nut bearing against an abutment of said carriage frame, and means for operating said nut from the driver's seat of the motor plow.

In testimony whereof we affix our signatures in presence of two witnesses.

ERNST WENDELER.
BOGUSLAV DOHRN.

Witnesses:
HENRY HASPER,
WOLDEMAR HAUPT.